United States Patent
Quintus

(10) Patent No.: US 7,186,196 B2
(45) Date of Patent: Mar. 6, 2007

(54) BELT TENSIONER WITH INTEGRAL DAMPING

(75) Inventor: James G. Quintus, Springfield, MO (US)

(73) Assignee: Dayco Products, LLC, Miamisburg, OH (US)

( * ) Notice: Subject to any disclaimer, the term of this patent is extended or adjusted under 35 U.S.C. 154(b) by 0 days.

(21) Appl. No.: 10/198,214

(22) Filed: Jul. 18, 2002

(65) Prior Publication Data

US 2004/0014542 A1    Jan. 22, 2004

(51) Int. Cl.
*F16H 7/18*    (2006.01)

(52) U.S. Cl. ...................................................... 474/135

(58) Field of Classification Search ................. 474/101, 474/109, 111, 113, 133, 135
See application file for complete search history.

(56) References Cited

U.S. PATENT DOCUMENTS

| 3,924,483 | A |   | 12/1975 | Walker et al. |
| 4,473,362 | A |   | 9/1984  | Thomey et al. |
| 4,696,663 | A |   | 9/1987  | Thomey et al. |
| 5,011,460 | A | * | 4/1991  | Ouchi et al. ................. 474/133 |
| 5,030,172 | A |   | 7/1991  | Green et al. |
| 5,083,984 | A |   | 1/1992  | Quintus et al. |
| 5,129,864 | A |   | 7/1992  | Quintus et al. |
| 5,169,368 | A |   | 12/1992 | Quintus et al. |
| 5,190,502 | A | * | 3/1993  | Gardner et al. ............. 474/135 |
| 5,205,792 | A |   | 4/1993  | Quintus et al. |
| 5,443,424 | A |   | 8/1995  | Henderson |
| 5,545,095 | A |   | 8/1996  | Henderson |
| 5,632,697 | A |   | 5/1997  | Serkh |
| 5,718,649 | A |   | 2/1998  | Hong et al. |
| 5,803,850 | A |   | 9/1998  | Hong et al. |
| 6,206,797 | B1 |  | 3/2001  | Quintus |
| 6,217,470 | B1 |  | 4/2001  | Quintus |
| 6,231,465 | B1 | * | 5/2001 | Quintus ...................... 474/133 |
| 6,364,795 | B1 |  | 4/2002  | Komorowski et al. |
| 6,565,468 | B2 | * | 5/2003 | Serkh ......................... 474/135 |
| 2003/0119615 | A1 | * | 6/2003 | Meckstroth et al. ........ 474/135 |

FOREIGN PATENT DOCUMENTS

| JP | 6-313465   | * | 11/1994 | ................... 474/94 |
| WO | WO-9425779 | * | 11/1994 | ................. 474/135 |

* cited by examiner

*Primary Examiner*—Vicky A. Johnson
(74) *Attorney, Agent, or Firm*—Joseph V. Tassone; J. Daniel Lykins

(57) ABSTRACT

A belt tensioner with integral damping comprising a housing, a pivot bushing, a spring element, a disc-shaped spring bushing, a lever arm assembly, a pulley assembly, an armplate assembly including an armplate and a friction element; wherein the armplate assembly comprises an armplate having a cup-shaped cavity including a circumferential edge and a plurality of spaced apart finger elements extending from said circumferential edge wherein the finger elements are configured to provide a high degree of damping in a radial direction., and a friction element disposed between the fingers elements and the armplate, the friction element providing at least one contact area having increased friction between the lever arm and the armplate.

28 Claims, 2 Drawing Sheets

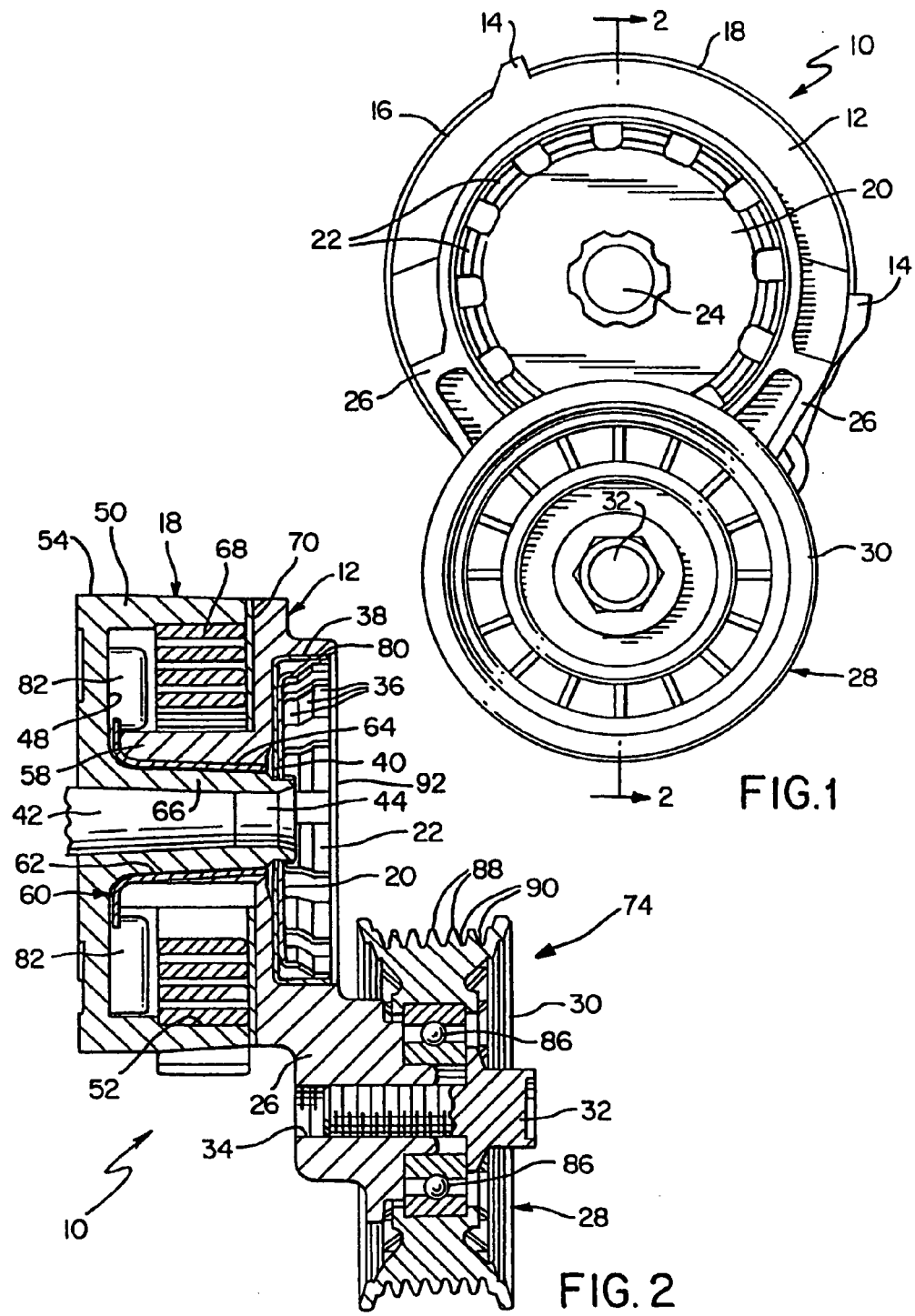

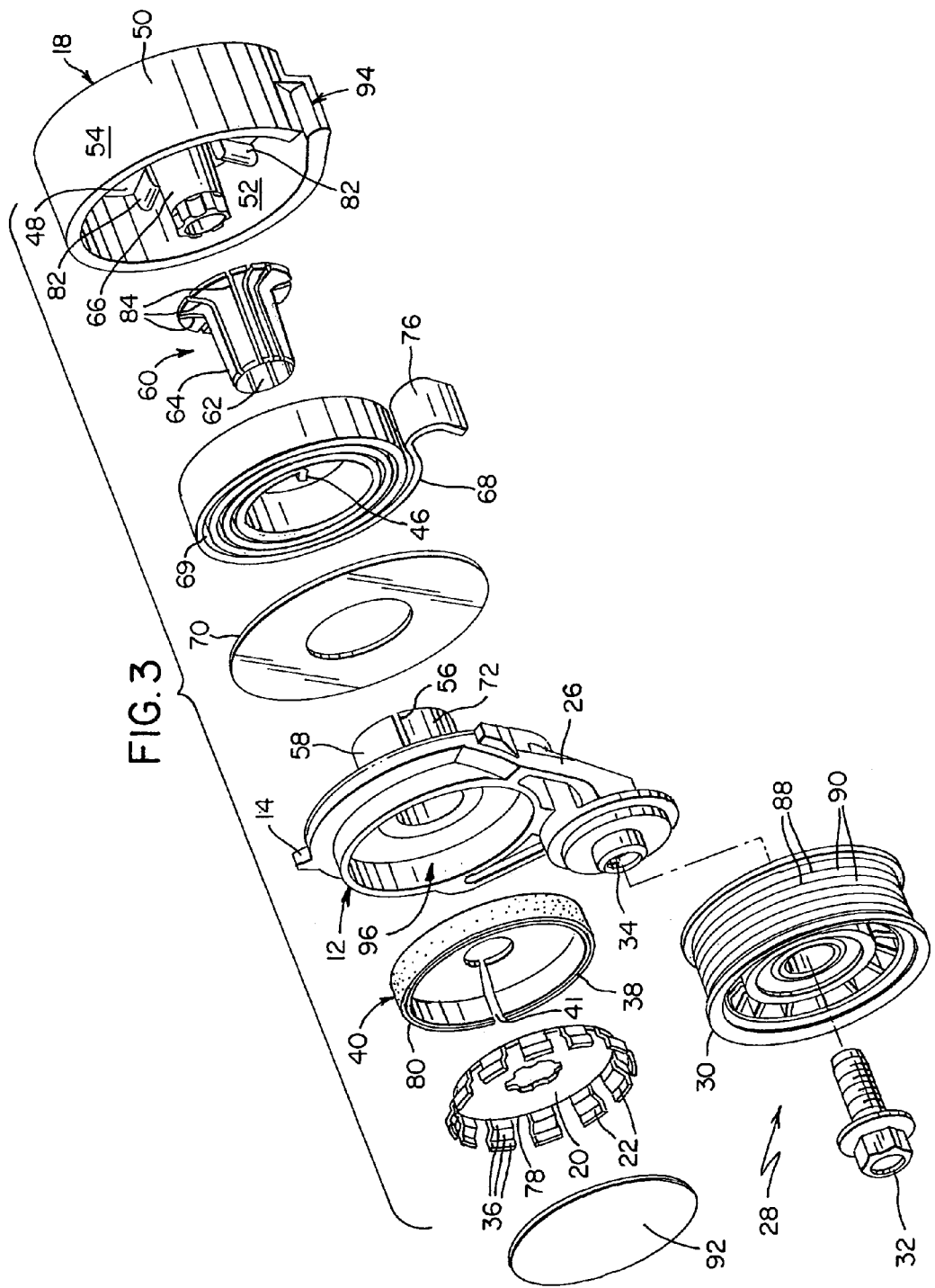

BELT TENSIONER WITH INTEGRAL DAMPING

FIELD OF THE INVENTION

The present invention relates to belt drive systems and, particularly to a tensioning device for power transmission belts and the like. Specifically, the present invention relates to a tensioning device that is independent of the axial force on the tensioner and which will provide improved pulley alignment and longer tensioner life.

BACKGROUND OF THE INVENTION

In the automobile industry, the various vehicle accessories such as power steering pump, oil and air pump, air conditioner, alternator, and the like, are operated by a single endless belt driven by a pulley connected to the engine crankshaft. Such system is typically referred to as a "serpentine" drive belt system. To provide optimum operating efficiency for the above-mentioned and other various accessories, it is imperative that a predetermined tensioning force be maintained on the drive belt to insure efficient performance of the accessories as well as satisfactory service life for the belt. Because of the length of the drive belt, there is a tendency for the belt to stretch due to wear and vibration, affecting the operating characteristics of the belt driven accessories. Therefore, it is conventional to use a belt tensioning device to provide a constant tensioning force on the belt to compensate for the increased length of the belt due to such stretching. Reference is made to commonly assigned U.S. Pat. Nos. 5,030,172; 5,443,424; 5,545,095; 5,718,649; 5,803,850 and 6,206,797, each of which is incorporated herein by reference, for examples of prior art belt tensioners.

A common type of belt tensioner embodies a stationary housing and an angular displaceable lever arm that carries a belt engaging pulley. A coil spring is braced against the stationary housing and displaceable lever arm and biases the latter toward the belt with a tensioning force varying in accordance with the vibrational nature of the belt. Despite the varying spring force, a substantially constant force acting upon the lever arm is maintained.

It is desirable that a belt tensioner be provided with a damping means to prevent excessive oscillation from occurring in the spring member. Such means is designed to absorb sudden shocks and to prevent a whipping action from occurring in the tensioner and drive belt. This damping means is especially critical when a coil spring is used for applying the belt tensioning force since it is inherent to coil springs to develop natural oscillation frequencies upon applying of the fluctuating counter force by the belt. Such fluctuations diminish the efficiency of tensioning force of the spring. However, the damping requirements are essential in order to enable the belt system to function over an extended period on a pulsating machine without affecting a tensioning force that acts upon the drive belt.

For example, a belt tensioning device has been proposed in U.S. Pat. No. 3,924,483 to Walker et al. wherein there is disclosed a torsional spring for pivotally moving one of the vehicle accessories to achieve the desired tensioning forces. Other tensioners of the above-described type utilize a pair of torsional springs for pivotally moving a lever and an idler pulley into belt tensioning engagement which results in an economic and compact unit. Specifically, in this type of tensioner, each spring is mounted on a respective side of the lever and engaged with the lever and housing for biasing the intervening lever toward the belt in a belt tensioning direction. Furthermore, the automobile industry has recognized the vibrational environment of an automobile belt system and its effect on spring oscillation.

U.S. Pat. No. 4,696,663 discloses a belt tensioner that includes a stationary housing 12, a lever arm 30, and a torsional spring 20 which is braced against the housing and the lever and biases the lever in a belt-tensioning direction. The belt tensioner is equipped with a brake 60 actuated by the spring into frictional engagement with a housing wall 13. Since the torsional spring provides both the tensioning force for the lever and the actuating brake force, the amount of damping is proportional to the belt tensioning force.

U.S. Pat. No. 4,473,362 discloses a separate damping body 108 whose damping characteristics are not constant but vary proportionately with the position of a pivot structure 40 relative to a stationary structure 36. A coil spring is mounted between the fixed and pivoted structures for resiliently biasing the latter in a direction away from the first limiting position thereof toward the second limiting position with a spring force, which increases as the pivot structure is displaced toward the belt. The damping body has a relatively tight fit at its inner periphery with the lower outer periphery of a core member 48 and a relatively loose fit between its exterior periphery and an interior periphery of the pivot structure. Angular displacement of the pivot structure between its first and second limiting positions is accompanied by a sliding movement between the exterior periphery of the damping body and the inner periphery of a mounting portion of the contacting surfaces varies in accordance with the position of the pivot structure, the amount of friction likely varies as well and, hence, the torsional force required to overcome the frictional force may also vary. Thus, the arm advantageously experiences a greater damping effect in a belt-releasing direction.

Commonly assigned U.S. Pat. No. 6,206,797 to Quintus discloses belt tensioner configurations that create damping by increasing friction between the spring bushing arm and spring case and between the armplate bushing, armplate and arm. The increase in friction is achieved by increasing the axial load on the tensioner components using springs or deflected armplates. While providing effective damping, this configuration also increases the loads on critical wear areas that are essential to maintaining the alignment of the pulley. Accordingly, it is desirable to have a structure which overcomes the above-discussed drawbacks.

BRIEF SUMMARY OF THE INVENTION

It is therefore an object of the invention to provide a belt tensioner with damping that is independent of the axial force of the tensioner.

It is another object of the invention to provide a belt tensioner with a high level of damping while reducing the forces on critical wear areas.

It is still another object of the invention to provide a belt tensioner having improved pulley alignment.

It is yet another object of the invention to provide a belt tensioner having a longer tensioner life.

It is another object of the invention to improve assembly methods of a belt tensioner to achieve proper level of damping by eliminating precise positioning of the arm plate.

The above objects are achieved in accordance with the invention wherein a belt tensioner includes integral damping that is independent of the axial force on the tensioner. The damper consists of an arm and a spring steel armplate that has been formed in a cup shape. The edges of the cup-shaped armplate are modified to provide "fingers" which act as springs to provide force in a radial direction. A friction material is included between the fingers and the arm to form a contact area which increases friction between the arm and the armplate thus producing damping. The friction material is characterized, in an exemplary embodiment, as a polymeric material; however, it is within the scope of the invention to utilize suitable alternative materials, or combinations of materials or components, which exhibit characteristics effective to increase friction between the arm and the armplate of the present invention. In accordance with the invention, the friction material may be co-molded onto either the inner or outer portion of the cupped armplate. If the friction material is co-molded onto the cupped armplate, it may also include a provision to seal the tensioner to prevent contamination from entering the damping cavity of the belt tensioner.

The armplate is keyed to a pivot means of the tensioner to prevent rotation of the armplate and provide relative movement between the friction material and the arm. Since the damping force is independent of the axial force needed to hold the tensioner assembly together, bushings disposed in the tensioner to keep the arm aligned will wear less, increasing the life of the tensioner. Methods of assembling the tensioner of the present invention are also improved because precise positioning of the armplate to achieve proper level of damping is eliminated.

According to the invention, the above-described belt tensioner allows a high level of integral damping while reducing the forces on critical wear areas providing improved pulley alignment and longer tensioner life.

BRIEF DISCRIPTION OF THE DRAWINGS

FIG. 1 is a top plane view of the belt tensioner having integral damping of the present invention;

FIG. 2 is a cross-sectional view taken through line 2—2 of the belt tensioner of FIG. 1; and FIG. 3 is a perspective, exploded view of the belt tensioner of FIG. 1.

DETAILED DESCRIPTION OF THE INVENTION

Referring now to the drawings, FIG. 1 illustrates a belt tensioner in accordance with the invention wherein the belt tensioner 10 includes a lever arm 12 having a plurality of stops 14 which extend radially outward from the outer periphery 16 of the lever arm 12 to limit the rotation of the arm 12, a housing 18 into which the lever arm 12 is disposed, tensioner armplate (damper) 20 having a plurality of finger elements 22 extending from the peripheral edge of the armplate 20 to provide a spring force in a radial direction, and a locking member 24 for securing the armplate 20 to the housing 18. The lever arm 12 further includes a support member 26 fixedly attached to and extending outwardly from the lever arm 12 for accepting and supporting a pulley assembly 28 (FIG. 3) which includes a pulley 30, a mounting bolt or pin 32 and a mounting aperture 34 into which the mounting bolt or pin 32 is connected to secure the pulley 30 to the support member 26.

as shown in FIGS. 2 and 3, the bell tensioner comprises:

a pivot shaft 42 extending along a longitudinal axis and formed with an outer axial end 44;

a housing 46 having a horizontal bottom 48 and a circumferential wall 50 extending vertically from the horizontal bottom and baiting an inner circumferential wall surface 52 and an outer circumferential wall surface 54, the housing being mounted and rotatably fixed on the pivot shaft 42;

a pivot bushing 60 having and inner circumferential wall surface 62 and an outer circumferential wall surface 64 to aid in maintaining alignment of the lever arm 12, the pivot bushing 60 being axially disposed on the outer surface of the pivot shaft 42 such that said inner circumferential wall surface 62 is adjacent to an outer surface of a sleeve 68 66 surrounding the pivot shaft 42 in housing 18 and extending along the longitudinal axis;

a spring element 68. preferably a steel coil, which may include a suitable polymeric anti-friction tape 69, such as teflon tape, disposed between the steel coils of the spring 68, is operably connected to the housing 18 via arm 76 engaged in slot 94 and to a lever arm 12 via arm 46 engaged in slot 56 for pivoting the lever arm 12 about the longitudinal axis in a belt-tensioning direction;

a spring bushing 70 axially disposed between the spring element 68 and the lever arm 12, the spring bushing 70 having an outer circumference commensurate with the circumference of the outer circumferential surface of the vertical circumferential side wall 50 of housing 18 and an inner circumference commensurate with the outer circumferential wall surface 72 of said tabular proximal end 58 of the lever arm;

a lever arm 12 mounted pivotally on the pivot shaft 42 and formed with a damping cavity 96, a distal end 26 and a tubular proximal end 58 the tubular proximal end 58 extending into and operably connected to the housing 18;

an armplate assembly, comprising:

(a) an armplate 20, preferably made of spring steel and having a cup-shaped cavity including a circumferential edge 78 and a plurality of spaced apart finger elements 22 extending from said circumferential edge 78, and a plurality of spaced apart finger elements 22 extending from the circumferential edge 78; and (b) a friction element 40 disposed between the finger elements 22 and on a surface of the armplate 20 for providing at least one contact area having increased friction between the lever arm 12 and the armplate 20; and a pulley assembly 28 mounted on the distal end of the lever arm 12 for receiving an endless drive belt (not shown) and applying a tensioning force on the endless drive belt upon pivoting the lever arm in a belt-tensioning direction, the distal having the pulley mounted thereon being spaced apart from the upper end of said pivot shaft 42.

In accordance with the invention, the plurality of finger elements 22 extend generally outward and are configured to have one or more angular surfaces 36. Each of the finger elements 22 act as a spring to provide a force in a radial direction upon the side wall 38 of the friction element 40. Friction element 40 includes a cutout portion 41 which allows the friction element 40 to easily fit into the damper cavity 96 in the lever arm 12. Typically, the finger elements 22 are made of a rigid material which can provide spring-like characteristics when the fingers are bent upward in a radial direction. The finger elements preferably contain more than one angular surface which enhance the spring-like characteristics to produce a more uniform and enduring pressure. The finger elements 22 of the armplate 20, when urged against the side wall 38 and the circumferential surface 80 of the friction element 40 creates fiction while providing damping to the belt tensioner. A cover plate 92 may be used to cover the open end of the lever arm 12.

A friction element 40 is disposed between the armplate 20 and the lever arm 12. Typically, the friction element 40 is a wear resistant plastic material. Exemplary wear resistant materials include, e.g., polyamides (PA); polyetherimides (PEI); polysulfones (PS) polyether sulfones (PES); polyoxymethylenes (POM), e.g., polyacetals; polyetheretherketones (PEEK); polyphenylene sulfides (PPS); polyphthalamides (PPA); polyphthalimides (PPI); and the like, or mixtures or blends thereof. Preferably, the friction element 40 is a wear resistant polyamide such as nylon 6, nylon 4, nylon 9, nylon 11, nylon 12, nylon 66, nylon 510, nylon 611, or nylon 46. In a preferred embodiment of the invention, the polyamide friction 40 is co-molded onto the armplate 20 wherein the friction material element 40 includes a sealing means 80 such as a series of labyrinths or flanges, or a portion of the friction element 40 contacts the lever arm 20 to form a seal to prevent contaminates from entering the damping cavity.

The pivot bushing 60 has one flared end which faces the horizontal bottom 48 of the housing 18. The pivot bushing 60 further contains a plurality of grooves 84, each of which extends the longitudinal length of the pivot bushing 60. The pivot bushing 60 is secured to the horizontal bottom 48 of the housing 18 via a corresponding number of small notches located in the bottom inner corner of each of the ribs 62 which are formed radially on the bottom of the housing 18.

The pulley assembly 28 includes a pulley 30 containing a bearing 86 such as a ball bearing and mounting means such as a mounting bolt or pin for mounting the pulley onto the pulley assembly 28 which is fixedly attached to the distal end of lever arm 12. The outer peripheral surface of the pulley 30 comprises a plurality of protrusions 88 and recess 90 thereon, said plurality of protrusions 88 and recesses 90 extending circumferentially around said pulley 30. The protrusions and recesses may be in the form of V-shaped projections and recesses, truncated V-shaped projections and recesses or any other useful design.

While the above disclosure has described various embodiments, it is to be understood that the invention is not limited thereto, and is susceptible to numerous changes and modifications as known to those skilled in the art. Therefore, this invention is not limited to the details shown and described herein, and includes all such changes and modifications as are encompassed by the scope and spirit of the appended claims.

What is claimed is:

1. A belt tensioner with integral damping for use in conjunction with a pulley assembly for tensioning an endless drive belt of a drive system, said belt tensioner comprising: a housing, a pivot shaft, a pivot bushing, a spring element, a disc-shaped spring bushing, a lever arm assembly, a friction element, an armplate, and a pulley assembly;

wherein said housing comprises a cup-shaped body having a closed circumferential end, a cylindrical wall extending perpendicularly from said circumferential end along a longitudinal axis, and an open circumferential end opposite said closed circumferential end, said closed circumferential end including a plurality of ribs radially disposed on an inner surface thereof, said plurality of ribs including securing means for securing said pivot bushing to said housing wherein said pivot shaft comprises a cylindrical member having a proximal end, a distal end and an outer surface extending axially from said proximal end to said distal end, said pivot shaft further comprising a coupling means on said distal end thereof for fixedly mounting said armplate onto said distal end of said pivot shaft, said pivot shaft being fixedly secured to said closed circumferential end of said housing along said longitudinal axis, said coupling means configured to prevent axial rotation of said armplate with respect to said pivot shaft;

wherein said pivot bushing comprises a cylindrical body portion having an outer cylindrical wall surface, said pivot bushing further comprising a flared end, said flared end facing said closed circumferential end of said housing, said pivot bushing further comprising a plurality of grooves extending the longitudinal length of said pivot bushing, said pivot bushing being axially disposed on said outer cylindrical surface of said pivot shaft and secured to said housing by said securing means;

wherein said spring element is disposed in said housing between said cylindrical body portion of said pivot bushing and said cylindrical wall of said housing, a first end of said spring element being operatively connected to said housing and a second end of said spring element being operatively connected to said lever arm;

wherein said disc-shaped spring bushing is axially disposed between said spring element and said lever arm, said spring bushing having an outer circumferential surface commensurate with the circumferential surface of the outer edge of the circumferential wall of said housing, and a central circular opening having an inner circumferential surface commensurate with the outer circumferential wall of the tubular proximal end of said lever arm;

wherein said lever arm is pivotally mounted on said outer surface of said pivot bushing, said lever arm comprising a distal end and a proximal end, said proximal end including a cup-shaped damping cavity having an open end extending longitudinally from said distal end for accepting said armplate and said friction element, said proximal end further comprising a tubular member extending oppositionally from said cup-shaped damping cavity and longitudinally onto and operatively connected to said pivot bushing, whereby said lever arm is pivoted about said longitudinal axis in a belt tensioning direction, said lever arm further having, wherein said friction element comprises a first cup-shaved cavity having a flat bottom surface and a circumferential side surface, said friction element further including a centrally located aperture in said circumferential surface configured to prevent axial rotation of said friction element with respect to said lever arm, said friction element further comprising a cylindrical wall extending perpendicularly outward from said circumferential surface along a longitdinal axis, said friction element further comprising a cut-out portion extending from an outer rim of said cylindrical wall of said friction element to said centrally located aperture in said circumferential surface, such that said friction element tensionally fits into said cup-shaped damper cavity, said friction element providing a contact area having a high degree of damping on said cup-shaped damping cavity;

wherein said armplate comprises a second cup-shaved cavity having a flat bottom surface and a circumferential edge, said circumferential edge having a plurality of spaced apart finger elements extending radially outward from said circumferential edge and angularly with respect to said flat bottom surface, each of said finger elements having a surface area exhibiting one or more angular contours configured to enhance spring-like characteristics of said finger elements and provide a more uniform and enduring pressure as well as increased damping on said damping cavity in a radial direction, said armplate further comprising a centrally located aperture in said flat bottom surface, said aperture configured to mate with said coupling means on said axial end of said pivot shaft to prevent axial rotation of said armplate with respect to said lever arm; and wherein said pulley assembly is mounted on said distal end of said lever arm, said pulley assembly including a pulley for receiving an endless drive belt and applying a tensioning force on said endless drive belt upon pivoting said lever arm in said belt tensioning direction, and wherein said damping is independent of the axial force of said tensioner and said spring element.

2. The belt tensioner of claim 1 wherein said armplate is made of spring steel.

3. The belt tensioner of claim 1 wherein said spring element is a coil spring.

4. The belt tensioner of claim 1 wherein said spring element is made of steel.

5. The belt tensioner of claim 1 wherein said friction element is a wear resistant plastic material selected from the group consisting of polyamides (PA); polyetherimides (PEI); polysulfones (PS) polyether sulfones (PES); polyoxymethylenes (POM), polyacetals; polyetheretherketones (PEEK); polyphenylene sulfides (PPS); polyphthalamides (PPA); polyphthalimides (PPI); and mixtures thereof.

6. The belt tensioner of claim 5 wherein said wear resistant plastic material is a polyamide.

7. The belt tensioner of claim 1, wherein said centrally located aperture of said friction element is configured to mate with said coupling means on said axial end of said pivot shaft, said coupling means configured to prevent axial rotation of said frictional element with respect to said pivot shaft.

8. The belt tensioner of claim 1 wherein said friction element and said armplate comprise a unitary assembly, wherein said friction element is molded onto said armplate.

9. The belt tensioner of claim 1 wherein said armplate assembly provides sealing of said armplate cavity to prevent contaminants from entering said damping cavity.

10. The belt tensioner of claim 1 further comprising a fixing member for fixedly securing said armplate to said pivot shaft.

11. The belt tensioner of claim 10, wherein said fixing member is a bolt or pin.

12. The belt tensioner of claim 1 further comprising a cover plate configured to mate with a circumferential rim of said cup-shaped damping cavity of said lever arm.

13. The belt tensioner of claim 1, further comprising a sleeve over said pivot shaft to aid in maintaining alignment of said lever arm.

14. The belt tensioner of claim 1, wherein said lever arm further comprises at least one stop extending radially outward from an outer periphery thereof to limit rotation of said lever arm.

15. A method for assembling a belt tensioner having integral damping, wherein said damping is independent of the axial force of said tensioner, said method comprising the steps of:

providing a housing including a pivot shaft, wherein said housing comprises a cup-shaped body having a closed circumferential end, a cylindrical wall extending perpendicularly from said circumferential end along a longitudinal axis, and an open circumferential end opposite said closed circumferential end, said closed circumferential end including a plurality of ribs radially disposed on an inner surface thereof, said plurality of ribs including securing means for securing a pivot bushing to said housing said pivot shaft comprising a cylindrical member and having a poroximal end, a distal end and an outer cylindrical surface extending axially from a central location on said proximal end to said distal end, said pivot shaft further comprising a coupling means on said distal end thereof for mounting a friction element and an armplate onto said distal end of said pivot shaft, said pivot shaft being fixedly secured to said closed circumferential end of said housing along said longitudinal axis, said coupling means configured to prevent axial rotation of said friction element and said armplate with respect to said lever arm;

providing a pivot bushing having a cylindrical body portion including a cylindrical wall surface to aid in maintaining alignment of said lever arm, and a flared end, said pivot bushing having a purality of grooves extending the longitudinal length of said pivot bushing;

mounting said pivot bushing on said pivot shaft wherein said pivot bushing is axially disposed on said outer cylindrical surface of said pivot shaft and secured to said housing by said securing means;

providing a coiled spring element having a first end and a second end;

mounting said coiled spring element in said housing wherein said first end is operatively connected to said housing;

providing a spring bushing having a flat circumferential surface and a centrally located aperture therein;

mounting said spring bushing on said open circumferential end of said housing enclosing said pivot bushing and said spring element therein;

providing a lever arm comprising a distal end and a proximal end, said proximal end including a cup-shaped damping cavity having an open end extending longitudinally from said distal end, said proximal end further comprising a tubular member extending oppositionally from said cup-shaped cavity and longitudinally and operatively connected onto said pivot bushing and to said spring element, whereby said lever arm is pivoted about said longitudinal axis in a belt tensioning direction, said lever arm further having at least one stop extending radially outward from an outer periphery thereof to limit rotation of said lever arm mounting said lever arm on said pivot bushing in said housing wherein said cup-shaped damping cavity extends longitudinally outward from said housing and said tubular member extends into said housing an on said pivot bushing;

operatively connecting said second end of said spring element to said tubular member;

providing a friction element having a first cup-shaped cavity corresponding to said cup-shaped damping cavity in said proximal end of said lever arm, wherein said friction element comprises a circumferential surface having a centrally located aperture configured to prevent axial rotation of said friction element with respect to said lever arm, said friction element further comprising a cylindrical wall extending perpendicularly outward from said circumferential surface along a longitudinal axis, and a cut-out portion extending from an outer rim of said cylindrical wall of said friction element to said centrally located aperture in said circumferential surface;

installing said friction element into said cup-shaped damping cavity in said proximal end of said lever arm such that said friction element tensionally fits into said cup-shaped damper cavity, and said coupling means on said pivot shaft fixedly secures said friction element to said pivot shaft to prevent rotation of said friction element relative to said lever arm, said friction element providing a contact area having a high degree of damping on said cup-shaped damping cavity in said proximal end of said lever arm;

providing an armplate comprising:

a second cup-shaped cavity corresponding to said first cup shaped cavity in said friction element, said armplate including a flat bottom having a circumferential edge, said circumferential edge having a plurality of spaced apart finger elements extending radially outward from said circumferential edge and angularly with respect to said flat bottom, each of said finger elements having a surface area exhibiting one or more angular contours configured to enhance spring-like characteristics of said finger elements and provide a more uniform and enduring pressure as well as increased damping on said cup-shaped damping cavity in a radial direction, said armplate further comprising a centrally located aperture in said flat bottom, said aperture configured to mate with said coupling means on said distal end of said pivot shaft; and installing said armplate into said first cup-shaped cavity in said friction element such that said centrally located aperture in said flat bottom of said armplate, configured to mate with said coupling means on said distal end of said pivot shaft in said flat bottom of said armplate, engages said coupling means on said distal end of said pivot shaft to prevent axial rotation of said armplate with respect to said lever arm;

providing a pulley assembly including a pulley for receiving an endless drive belt; and mounting said pulley assembly on said distal end of said lever arm, wherein said pulley assembly applies a tensioning force on said endless drive belt upon pivoting said lever arm in a belt tensioning direction, and wherein said damping is independent of the axial force of said tensioner and said spring element.

16. The method of claim 15 further comprising installing a sleeve over said pivot shaft to aid in maintaining alignment of said lever arm.

17. The method of claim 15, wherein said coil spring element is operatively connected to said housing and to said lever arm for pivoting said lever arm about said longitudinal axis in a belt tensioning direction.

18. The method of claim 15 wherein said angular spring bushing has an outer circumference commensurate with the circumference of said outer circumferential surface of said circumferential wall in said housing, and an inner circumference commensurate with the outer circumferential wall of said tubular proximal end of said lever arm.

19. The method of claim 15, wherein said steps of providing a friction element, installing said friction element, providing an armplate, and installing said armplate, comprise providing an armplate assembly comprising said friction element and said armplate, wherein said friction element is molded onto said outer cup-shaped surface of said armplate, and installing said armplate assembly, wherein said armplate assembly provides sealing of said armplate cavity to prevent contaminants from entering said cup-shaped damping cavity.

20. The method of claim 15, wherein said centrally located aperture of said friction element is configured to mate with said coupling means on said axial end of said pivot shaft, said coupling means configured to prevent axial rotation of said frictional element with respect to said lever arm.

21. The method of claim 15 further comprising the steps of providing a fixing member for fixedly securing said armplate to said pivot shaft; and installing said fixing member such that said armplate is fixedly secured to said pivot shaft.

22. The method of claim 21, wherein said fixing member is a bolt or pin.

23. The method of claim 15 further comprising the steps of:

providing a cover plate configured to mate with a circumferential rim of said cup-shaped damping cavity of said lever arm; and installing said cover plate onto said circumferential rim of said cup-shaped damping cavity in said lever arm.

24. The method of claim 15, wherein said coiled spring element is a steel coiled spring element.

25. The method of claim 24, wherein said steel coiled spring element further includes an anti-friction material between said steel coils.

26. The method of claim 15, wherein said friction element is a wear resistant plastic material selected from the group consisting of: polyamides (PA); polyetherimides (PEI); polysulfones (PS) polyether sulfones (PES); polyoxymethylenes (POM), polyacetals; polyetheretherketones (PEEK); polyphenylene sulfides (PPS); polyphtbalamides (PPA); polyphthalimides (PPI); and mixtures thereof.

27. The method of claim 26, wherein said wear resistant material is a polyamide.

28. The method of claim 15, wherein said armplate is a spring steel armplate.

* * * * *